United States Patent
Fechalos et al.

[11] Patent Number: 6,046,994
[45] Date of Patent: Apr. 4, 2000

[54] MODULAR SWITCHING SYSTEM

[75] Inventors: William A. Fechalos, Naperville; Barry W. Jones, Hoffman Estates, both of Ill.

[73] Assignee: Rockwell International Corp., Costa Mesa, Calif.

[21] Appl. No.: 08/784,715

[22] Filed: Jan. 16, 1997

[51] Int. Cl.[7] .................................................. H04J 3/02
[52] U.S. Cl. ................................... 370/366; 370/383
[58] Field of Search .................................... 370/357, 366, 370/376, 452, 458, 460, 403, 404, 382, 383, 503

[56] References Cited

U.S. PATENT DOCUMENTS

| | | | |
|---|---|---|---|
| 4,661,952 | 4/1987 | von Sichart et al. | 370/460 |
| 5,245,605 | 9/1993 | Ofek | 370/447 |
| 5,268,903 | 12/1993 | Jones et al. | 370/110.1 |
| 5,452,348 | 9/1995 | Adams et al. | 379/202 |
| 5,502,817 | 3/1996 | Krone et al. | 395/200.16 |
| 5,544,232 | 8/1996 | Baker et al. | 379/67 |
| 5,699,356 | 12/1997 | Beever et al. | 370/404 |
| 5,809,021 | 9/1998 | Diaz et al. | 370/364 |

*Primary Examiner*—Min Jung
*Attorney, Agent, or Firm*—Welsh & Katz, Ltd.

[57] ABSTRACT

An apparatus and a method are provided for switching an information signal from a selected input to a selected output of a telecommunications switch. The method includes the steps of digitally sampling the information signal at the selected input of the telecommunication switch and writing the sampled information signal into a predetermined location of a data frame within a circulating data loop at a first station of the circulating data loop. The method further includes the steps of capturing the sampled information signal at a second station of the circulating data loop and transferring the captured information signal to the selected output of the telecommunications switch.

28 Claims, 7 Drawing Sheets

MODULAR SWITCHING SYSTEM

FIELD OF THE INVENTION

The field of the invention relates generally to signal switching systems and more particularly to switching systems used in telecommunications.

BACKGROUND OF THE INVENTION

Telephonic switches provide an important part of the functionality of a modern telephone system. While in the early days of the telephone an operator manually completed signal connections, that function has now been largely assumed by the telephone switch.

Where a subscriber places a call, a switch controller within a local telephone switch first collects the dialed digits from a calling party and then analyzes the dialed digits to identify a called party. Where the leading digit is something other than a "1" and the number of digits totals seven, the switch controller knows the call is a local call and proceeds accordingly. The switch controller may begin by comparing the called number prefix (e.g., the first three digits) with a set of look-up tables to identify the telephone exchange serving the called party.

The switch controller will typically first compare the prefix of the number received from the calling party with the prefix of those called numbers served locally through the same switch. Where the called number is determined to be the same, the switch controller then goes on to identify the particular telephone connection serving the called party. Upon precisely identifying the called party, the switch controller sends a set of control instructions to the switch to connect the called party and calling party.

Where the switch controller determines that the called party is served through another switch, the switch controller must transfer a call request to a switch controller of the other switch. To do so the local switch controller first identifies (through look-up tables), a trunk group interconnecting the local switch with the other switch (either directly or through other intermediate switches), and transmits a call request through the identified trunk group. Upon receiving a response, the local controller commands the local switch to set up a call connection between the calling party and appropriate connection of the trunk group.

In some cases a calling party may be directing a call to an organization (e.g., a corporation, governmental agency, etc.), instead of a particular person. Often the organization may provide a single telephone number to be used in gaining access to the organization. Such calls, once identified, are often routed from the public switch telephone network (PSTN) into a private telephone system (private branch exchange (PBX)) of the organization through a special trunk group provided for that purpose.

Once within the PBX, the call may be routed to one of a group of people (agents) qualified to receive the call through an automatic call distribution (ACD) system. Often the ACD functions by simply looking for an open telephone line among the group of agents. In other cases, the ACD may use more sophisticated methods of routing calls to an agent of the group of agents, based upon qualification.

ACDs are also often capable of routing calls in an outbound direction during call campaigns from any one of a group of agents to any one of a group of customers of the organization. While the identity of the called party may be selected in sequence from a database of the organization, the assignment of an agent to the call may be based primarily on agent availability, or agent qualification.

In making the connection between a calling party and called party either from within the PSTN or a PBX, the switch must be capable of making an internal connection between any two external terminals. Often the solid state switching fabric must be integrated into a monolithic matrix which mist then be mated to the switching system as a whole.

Because of the need of universal internal connectivity, a telephone switch embodies a great deal of internal complexity. Because of the internal complexity, it is often not possible to expand the connection capabilities of telephone switches, once they are constructed and placed in operation. As a consequence, telephone switches are usually custom designed for an application, taking into account the number of connections needed and projected rate of growth of the market.

Where a switch is improperly sized, or growth exceeds expectations, a telephone switch may be rendered practically obsolescent long before technical obsolescence occurs. Where such an event occurs, the switch must be replaced at great expense.

Switches used in telecommunications are very expensive to build and install and there is a strong incentive to avoid oversizing such switches. Because the cost and lead times associated with telecommunications switches, a need exists for a practical means of expanding the switching capabilities of such devices after initial construction and installation.

SUMMARY

Accordingly, it is an object of the invention to provide a telecommunications switch that may be fabricated of any convenient capacity.

It is a further object of the invention to provide a telecommunications switch which may be quickly and easily increased to a larger, convenient size, without the difficulty of reconstruction associated with prior art switches.

These and other objects are provided by an apparatus and a method of switching an information signal from a selected input to a selected output of a telecommunications switch. The method includes the steps of digitally sampling the information signal at the selected input of the telecommunication switch and writing the sampled information signal into a predetermined location of a data frame within a circulating data loop at a first station of the circulating data loop. The method further includes the steps of capturing the sampled information signal at a second station of the circulating data loop and transferring the captured information signal to the selected output of the telecommunications switch.

DETAILED DESCRIPTION OF A PREFERRED EMBODIMENT

Figure 1:
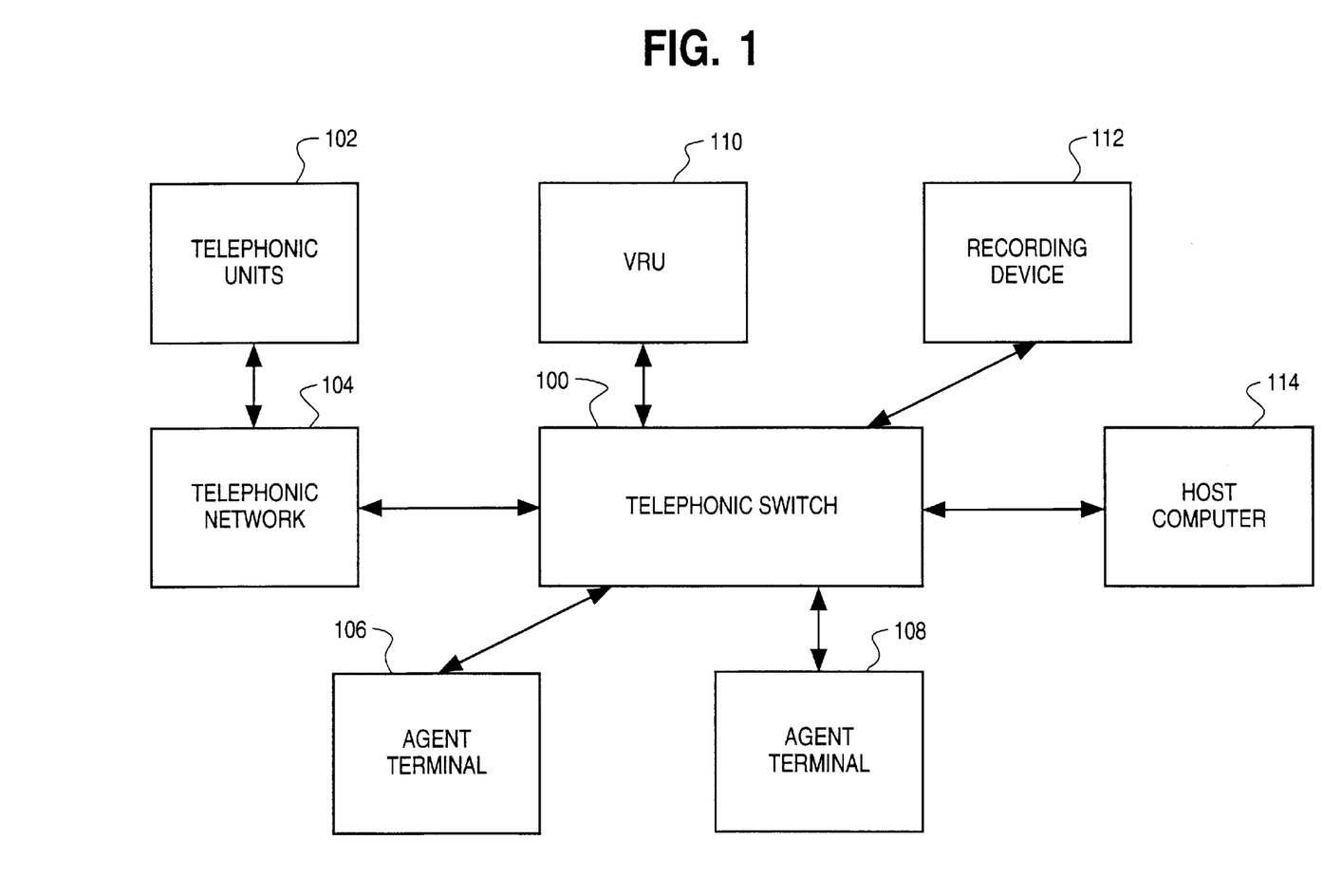
FIG. 1 depicts a telephone switch under an embodiment of the invention set in the context of an automatic call distribution system.

FIG. 1 shows a telecommunications (telephonic) switch 100 in accordance with an embodiment of the invention. The telephone switch 100 shown may have application within the public service telephone network (PSTN) or within a private branch exchange (PBX). The switch 100 may also be used for automatic call distribution systems (ACDs). For purposes of explanation, the context of use shown in FIG. 1 can be assumed to be that of an ACD.

The telephonic switch 100 receives incoming telephone calls from callers through telephonic units 102 and a telephonic network 104. The switch 100 routes the telephone calls to the appropriate organizational resource, or resources, for servicing. For example, a human agent (not shown) may handle a telephone call at an agent terminal 106, 108 or a voice response unit (VRU) 110 may automatically service a telephone call.

The telephonic switch 100 may further be connected to a recording device 112 which is used to record telephone calls, or portions of telephone calls. A host computer 114 may provide information relating to the telephone call, or caller, for immediate delivery (or for storage within the recording device 112 for later delivery) to a human agent through a display screen of the agent terminals 106, 108. For example, service from the telephonic network 104 to the switch 100 may be provided through an integrated services digital network (ISDN), including caller ID. The switch 100 may capture the caller ID (e.g., a customer telephone number) and transfer the caller ID through the switch 100 to the host computer 114. The host computer 114 may retrieve any available records relating to the calling customer using the caller's telephone number and display the records on agent terminal 106, 108 simultaneously with call delivery.

The resources shown in FIG. 1 are shown for exemplary purposes only and may include additional devices which may or may not be integral to the telephonic switch 100. The agent terminals 106, 108 may either be directly connected to the telephonic switch 100 or may be remotely connected through a computer network and/or the telephonic network 104. Those desiring additional information regarding the structure and philosophy of the operation of telephone switches and ACDs are referred to U.S. Pat. No. 5,544,232 to Baker et al. and U.S. Pat. No. 5,452,348 to Adams et al. (incorporated herein by reference).

Figure 2:
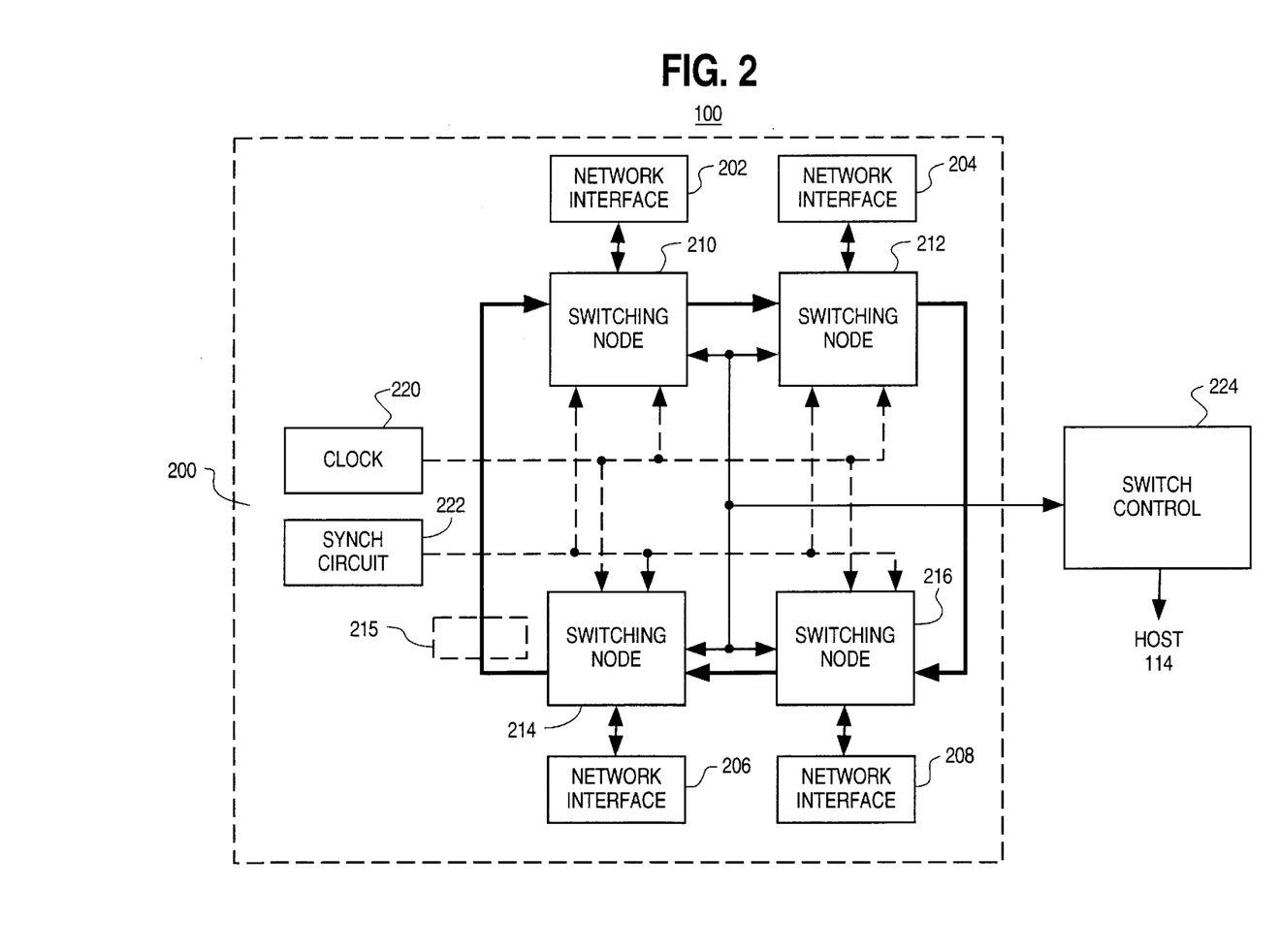
FIG. 2 depicts a block diagram of the telephone switch of FIG. 1.

FIG. 2 depicts a block diagram of a telephone switching system 100 shown in FIG. 1. Under the embodiment, the telephone switching system 100 includes a switching circuit (switch) 200 and a switch control computer 224. The switch 200 provides communication pathways among the telephone network 104, agent terminals 106, 108, VRU 110, recording device 112, and host computer 112 through a plurality of network interfaces 202, 204, 206, 208. The network interfaces 202, 204, 206, 208 are generally designated as network termination cards in the art.

The switch control 224 is comprised of various computer circuits, such as one or more microprocessors and memory devices, for controlling the switching functions of the telephone switch 100. The switch control 224 may also be provided with a separate interface with the host computer 114, as shown in FIG. 2. The interface may used by the host 114 for purposes of establishing call distribution parameters for incoming calls among the resources or for providing telephone numbers for outgoing calls during call campaigns.

Turning now to the internal operation of the switch 100, the network interfaces 202, 204, 206, 208 may be used to exchange data between the resources 104, 106, 108, 110, 112, 114 and a respective switching node 210, 212, 214, 216. The switching nodes 210, 212, 214, 216 selectively place data onto a high speed, serial pulse code modulated (PCM) ring 218. The switching nodes 210, 212, 214, 216 similarly receive data from the PCM ring 218 for delivery to a particular resource 104, 106, 108, 110, 112, 114. The switching nodes 210, 212, 214, 216 are synchronized with a clock signal received from a clock circuit 220 and a synchronization signal received from a synch circuit 222. The switch control 224 may provide instructions to the switching nodes 210, 212, 214, 216 for purposes of call switching. Operation of the switching system 200, and more particularly each switching node 210, 212, 214, 216 will now be described with reference to FIGS. 3 and 4.

Figure 3:
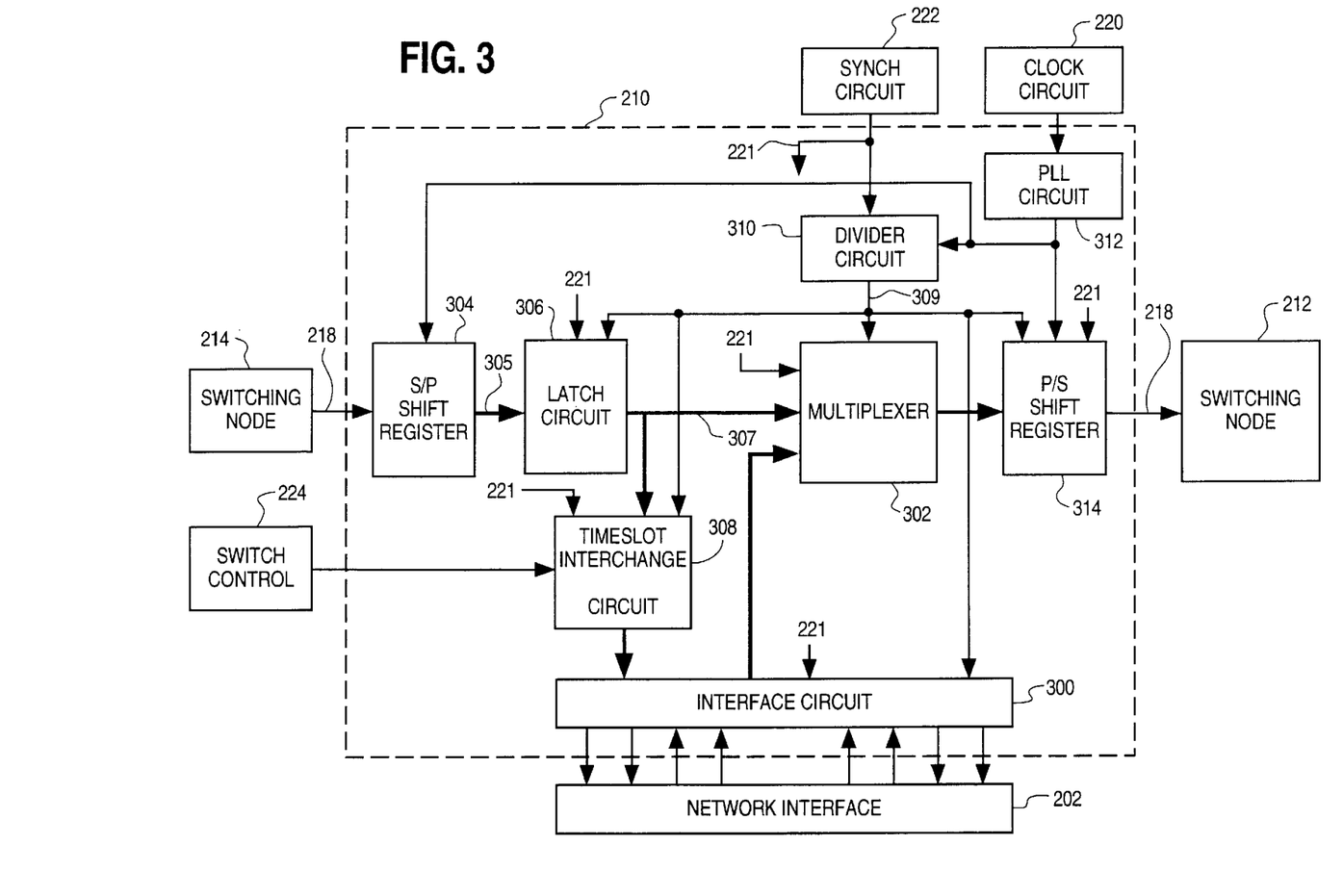
FIG. 3 depicts a block diagram of a switching node of the switch of FIG. 2.

FIG. 3 is a detailed block diagram of an embodiment of one of the switching nodes 210, 212, 214, 216 of the switch 200. While the switching node shown in FIG. 3 is designated to be that of switching node 210, it is understood that all of the switching nodes 210, 212, 214, 216 may be constructed in a similar manner. It is also to be understood that while FIG. 2 shows four switching nodes 210, 212, 214, 216, the concepts described herein may be extended to any number of switching nodes 210, 212, 214, 216 placed in series within the PCM ring 218, limited only by the speed of the ring 218.

The switching node 210 exchanges data with the network interface 202 over a plurality of channels. In one embodiment, there may be 772 two-way channels (ports) provided for the exchange of data between the network interface 202 and the interface circuit 300.

Under the embodiment, the PCM ring 218 may be thought of as a circulating data loop containing a circulating portion of a multi-frame (e.g., 500, FIG. 5) of data locations (e.g., 502, 504, 506, 508, 510). The clock 220 circulates the data locations around the loop 218. The synch signal 222 provides a reference to each switching mode as to the start of the multi-frame. The clock 220 and synch 222 also provide means of tracking data locations as they travel around the ring 218.

The PCM ring 218 provides a transport mechanism for moving PCM data from an input port to any output port. PCM data from any input port is inserted into a predetermined location of the circulating data loop 218 and circulated around the loop 218. At each node, the data from each location is captured and transferred to any selected output.

For purposes of simplicity, an explanation of the operation of the switch 100 will be provided in terms of a simplex connection between two ports. It is to be understood that a duplex connection is simply the two-way exchange of data between the same two ports.

We begin our explanation with the ring 218. Once an understanding of the ring 218 has been provided, an explanation will be provided of the mechanism for exchanging data between the ring 218 and selected output through the timeslot interchange circuit 308.

While the ring 218 could be considered to be similar to a Token Ring used in data systems, it differs in a number of respects. First, a Token Ring dedicates the entire ring to a single user at a time, whereas under the invention each active user only occupies a portion of the ring. Second, to gain control of a Token Ring, a user must pass a token symbol around the ring to determine conflicting use, whereas under the invention all users can simultaneously use the ring 218, without mutual interference. Third, a Token Ring operates asynchronously, whereas the ring 218 of the invention operates synchronously, with all modes provided with common clock and synch references.

For the portion of the ring 218 shown in FIG. 3, a PCM data word within a particular data location of the circulating data frame is received in a serial format from the switching node 214 by a serial to parallel converter (shift register) 304. Within the parallel converter 304, the serially formatted PCM word is converted into a parallel format. The PCM data (now in a parallel format at the output 305 of the register 304) is transferred to a latch circuit 306 upon completion of each serial to parallel conversion. The PCM parallel data is held within the latch circuit 306 until the next parallel data value is formulated in the shift register and is shifted to the right. Once the data has been captured within the latch 306, the data is transferred to the multiplexer 302. While the PCM data of the data location is held within the latch 306, the PCM data is also captured from the latch 306 by the timeslot interchange 308. An explanation of the timeslot interchange will be provided later.

Within the multiplexer 302, the PCM data in a particular location of the data frame may be shifted through the multiplexer 302 without change or it may be overwritten by data from the interface circuit 300. Under one embodiment of the invention, since there are four switching nodes 210, 212, 214, 216, every fourth data location of the circulating data frame is overwritten with a PCM data word from the interface circuit 300 of each node 210, 212, 214, 216 into a predetermined data location of the circulating data frame 500. Since the switch 100 is shown as having four nodes 210, 212, 214, 216 of 772 ports each, the circulating data frame 500 can be considered as having 3088 locations for the example shown in FIG. 2.

The PCM data from the interface circuit may be transferred to the multiplexer sequentially (e.g., from lowest number input port to highest number) for insertion of the PCM data words into predetermined locations. Alternatively, some algorithm may be used for the sequence of port selection.

Figure 5:
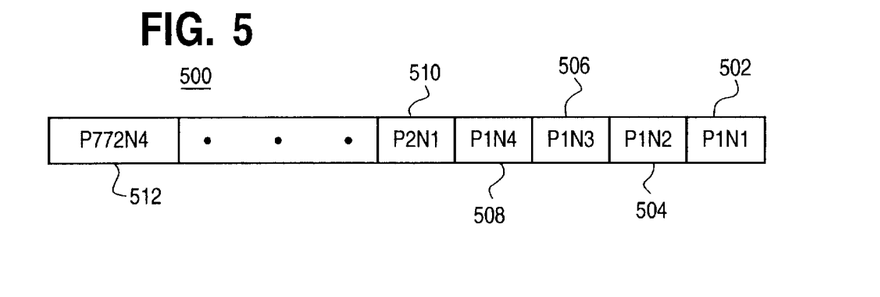
FIG. 5 depicts a circulating data frame, as perceived from the first node, of the telephone switch of FIG. 1.

For the examples shown in the figures, an input, P1N1, from the first port, P1, of the first node, N1, (referred to in FIG. 2 as 210) is written into the first location 502 of the data frame 500. Further, the synchronization signal 221 from the synch circuit 222 may be timed to occur concurrent with delivery of P1N1 into the frame (e.g. 502). Similarly an input P1N2 from a first port, P1, from the second node, N2, (referred to as 214) is written into the second location 504 of the frame 500, etc.

After PCM data from an input port of the interface circuit 300 has been multiplexed into the data frame, the data is shifted into a parallel to serial converter (shift register) 314. Within the parallel to serial converter 314 the PCM data is converted into a serial format and shifted to the next switching node 212.

The multiplexer 302 combines the PCM data from the output 307 of the latch 306 with PCM data received from the interface circuit 300 based upon the clocking signal 309 generated by the divider circuit 310 and the synch signal 221 from the synch circuit 222. When a clock signal 309 occurs concurrent with the synch signal 221 from synch circuit 222, data from a port of the interface circuit 300 is presented at the output of the multiplexer 302 to the P/S shift register 314. In a system of n nodes, during every nth occurrence of the clock signal 309 after the synch signal 221 from the synch circuit 222, data is likewise provided from a successive port of the interface circuit 300 as the output of the multiplexer 302. On every other occurrence of a clock signal 309 after the synch signal 221 from the synch circuit 222, data from the latch 306 is provided as output of the multiplexer 302 to the P/S shift register 314.

The output of the PLL circuit is the frequency at which the PCM ring operates. The PLL 312 at each node is provided with the same low frequency reference from the clock circuit 220. A low frequency reference is employed in the preferred embodiment for the practical considerations of cost and for purposes of reducing electromagnetic emissions. The PLL 312 provides a frequency conversion to the higher ring operating clock frequency and will phase lock to the distributed low frequency reference 220. The ring operating frequency is set as $L \times M \times N \times 8000$ Hz, where L is the number of bits per sample, M is the number of ports per switching node, and N is the number of switching nodes. The parallel-to-serial shift register 212 and serial-to-parallel shift register 304 transfer bits at this ring operating frequency. The delivery of parallel-formatted data values at the output of 304 and as an input to 314 occurs at a rate 1/L times the ring operating frequency. The divider circuit 310 thus creates the clock output 309 at a rate 1/L times the ring frequency. The phase of this clock output 309 is adjusted to be concurrent with the receipt of the synch signal 222 by the divider circuit 309. In the preferred embodiment, the synch signal occurs once every 8000 Hz at the beginning of the multi-frame 500.

The parallel to serial converter 314 converts the multiplexed parallel output of the multiplexer 302 into a serial pulse train in response to the locked clock signal. The serial pulse train is transmitted along the PCM ring 218 to the next node (i.e., node 212). Similarly, the serial to parallel converter 304 converts the serial pulsed signal into a parallel PCM data word for processing within each switching node 210, 212, 214, 216.

As a consequence of the converters 304, 314, the data within the circulating data frame does not remain in the same form as it is circulated around the loop 218. Between switching nodes 210, 212, 214, 216 the data of the data frame is transferred under a serial format. Within the switching nodes 210, 212, 214, 216 the data is transferred under a parallel format. Also, since each data node 210, 212, 214, 216 may only hold four PCM data words at a time (i.e., one each within the converters 304, 314, the latch 306 and the multiplexer 302) and since four data nodes 210, 212, 214, 216 may only hold a total of 16 PCM data words, it should be apparent that only a portion of the circulating data frame 500 would be contained within the ring 218 at any one instant of time. Further, after a particular PCM word has traveled around the loop 218, once, it is overwritten by a subsequent PCM word from the same port of the same node.

Turning now to the timeslot interchange 308 an explanation will now be offered as to how the data, now successfully written into a predetermined data location of the ring 218, is retrieved for delivery to an appropriate destination. The operation of the timeslot interchange 308 will be discussed with reference to FIG. 4. The timeslot interchange 308 captures the appropriate PCM word from the latch 306 for retransmission to the selected destination resource through the interface circuit 300 and network interface 202.

Figure 4:
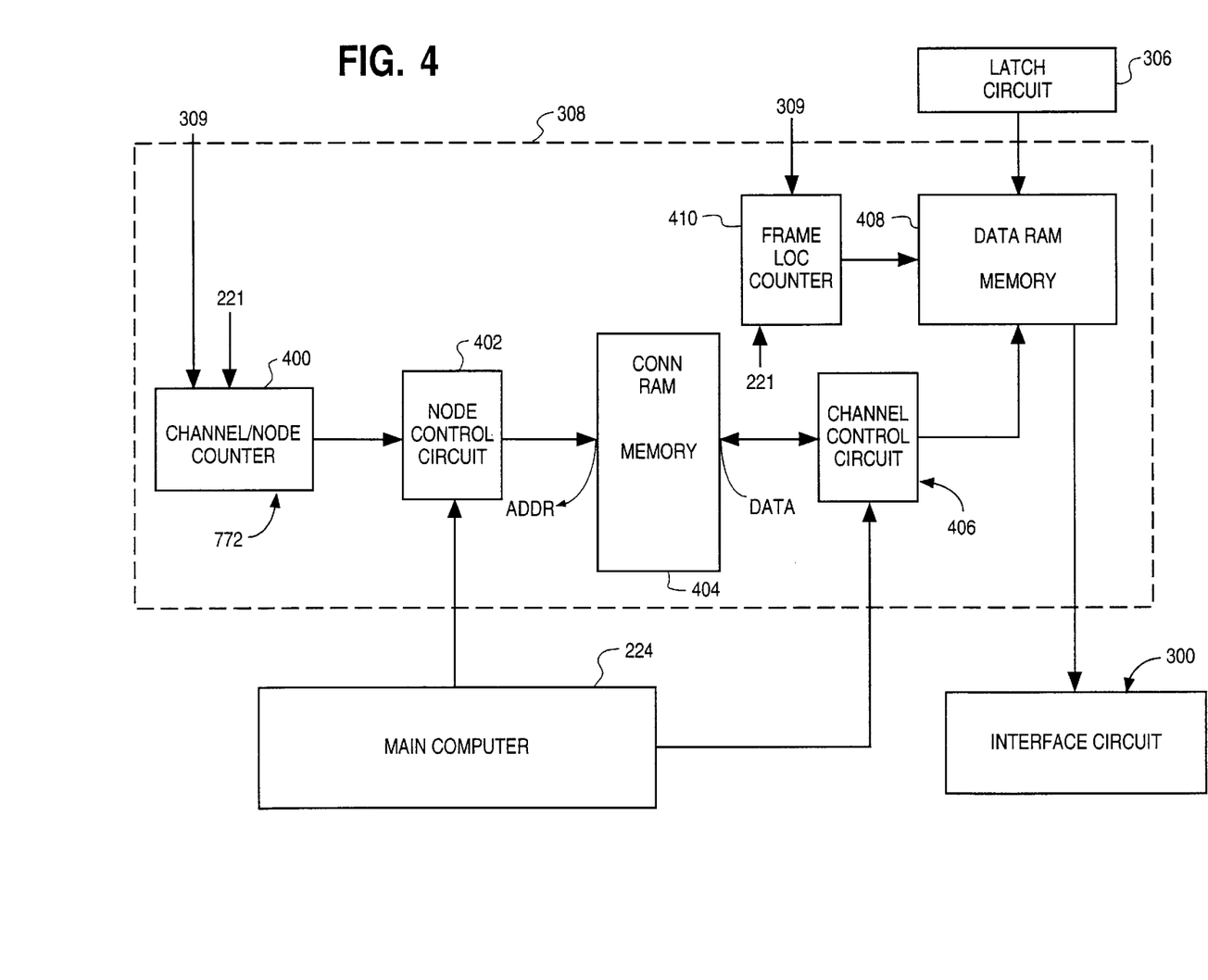
FIG. 4 depicts a timeslot interchange circuit of the switching node of FIG. 3.

The timeslot interchange 308 serves the function of transferring each PCM word from a predetermined location of the circulating data frame 500 to a selected output of the interface circuit 300. The timeslot interchange 308 includes a channel/node counter (channel counter) 400, conn RAM (connection) memory 404, frame location counter 410 and a data RAM 408. In addition, the timeslot interchange 308 also includes a node control circuit 402 and channel control circuit 406 which allow the selected outputs of the interface circuit to be changed by the switching computer 224 as part of the switching functionality provided by the switch 100.

The data RAM memory 408 stores each PCM word captured from the loop 218 in sequential locations as the data frame of the circulating data loop is circulated through the switching node 210. The address of each sequential location of each stored PCM word is generated by the frame location counter 410.

The frame location counter 410 increments each time a new PCM word is captured by the latch circuit 306 based upon a clocking signal from the divider circuit 310. Each time the frame location counter 410 increments, the output of the frame location counter identifies a new memory location for the next PCM word of the circulating data frame captured from the latch 304. For example, an output of "0" from the frame location counter 410 would result in the first PCM word, P1N1, (FIG. 5) being stored in the first memory location of the data RAM memory 408. Where the frame location counter 410 outputs a "1", the PCM word within the latch 306, P1N2, is stored in the second location, etc.

Where the switch 100 has four switching nodes 210, 212, 214, 216 of 772 ports each, the frame location (counter 410 could be a modulo 3088 counter (4×772), providing a memory address for each port of the four nodes 210, 212, 214, 216 of the switch 100. Similarly, the data RAM memory would also have an equal storage capacity (e.g., 3088 PCM data words of 8 bits each). Under another embodiment, the frame location counter 410 is a modulo 6176 counter (and the data RAM memory 408 has 6176 memory locations), holding two data frames of PCM data.

Providing a memory location for each port of the switch 100 within each node 210, 212, 214, 216 allows a PCM input from any port to be transferred and provided as an output at any other port, at the same or any other node. Further, storing two frames allows a first frame to be stored while PCM data of a second frame is provided to the selected outputs of the interface circuit 300.

Where it is desired to expand the switch 100 to provide a greater number of switching nodes (e.g., 12), the frame location counter 410 would be of a larger capacity. For example, if the switch 100 were expanded to 12 nodes of 772 ports each, the frame location counter 410 would be a modulo 9264 counter or a modulo 18528 counter where two frames of PCM data where stored in the data RAM 408.

The data RAM memory 408 is accessed by a set of sequentially accessed pointer addresses stored within the connection memory 404. The pointer addresses are created upon call setup and stored in the connection memory 404 by the switching computer 224. As with the data RAM memory 408, the connection memory uses a counter output (channel counter 400) for address selection. However, since each node 210, 212, 214, 216 has only 772 ports, the connection memory 404 need only store 772 pointer addresses. Each pointer memory location must be of sufficient size (i.e., width) to capture any data location in the circulating data frame (e.g., 13 bits wide in the case of four nodes with 3088 ports). Further, since the connection memory need only contain up to 772 pointer addresses for the example shown in FIG. 2, the channel counter 400 may also be a modulo 772 counter.

Where the data RAM memory 408 stores 2 frames, the connection memory 404 must be able to access 2 frames worth of pointer addresses. The timeslot interchange circuit 308 may do this by providing a most significant bit (MSB) from the frame location counter 410 as an auxiliary address bit for pointer addresses from the connection memory 404.

Upon setup of the switch 100, the switching computer 224 may designate the first location 502 of the data frame 500 as the predetermined location within the circulating data frame for an input PCM word, P1N1, from first port, P1, of the interface circuit 300 of the first switching node 210. The fifth location 510 of the circulating data frame 500 may be designated for an input data word, P2N1, from the second port number, P2, of the first node 210. The remaining input ports (i.e., 3–772) of the first node 210 may be designated to occupy every fourth location throughout the remainder of the circulating data frame 500.

Similarly, the second location number 504 of the circulating data frame 500 may be designated as the predetermined location of a PCM word, P1N2, from the first port of the second switching node 214. The third location 506 of the data frame 500 may contain the input from the first port of the third node 216. The fourth location 508 of the data frame 500 may contain the PCM word, P1N4, of the first port of the fourth node 212.

In the case where a call is to be set up between two ports (e.g., the second port, P2, of the first node 210 and the first port, P1, of the second node 214), the switching computer 224 would store the appropriate pointer addresses in the channel memories 404 of the timeslot interchange circuits 308 of each node 210, 214. In the case of the first node 210, the switching computer 224 would store the location of P1N2 in the fifth memory location of the connection memory 404 of the first node 210. Similarly, the switching computer 224 would store the location of P1N1 in the second location of the connection memory 404 of the second node 214.

As an aid to understanding the pointer addresses, it should be understood that the same data frame 500 is stored in the data RAM memory 408 of each node 210, 212, 214, 216. For example, if we ignore the impact of any PCM words in transit around the ring 218, then the data frame 500 of FIG. 5 may be used to represent the data in each data RAM memory 408 of each node 210, 212, 214, 216. In specific, the PCM data word P1N1 of the first location 502 of the circulating data frame 500 is stored in the first memory location of each data RAM memory 408. Similarly, the PCM data word P1N2 is of the second location 504 of the frame 500 is stored in the second location of data RAM memory 408. The PCM word P2N1 of the fifth location of the frame 500 is stored in the fifth location 510 of the frame 500 and data RAM memory 408.

Since the location of each PCM data word from each port of each node is known, the switching computer 224 simply stores the pointer address of a first port of a pair of communicating ports in the corresponding location of the second port in the connection memory 404 of the second port. For the example given of the first port of the second node communicating with the second node of the first node 210, the switching computer 224 would know that the second port of the first node would always be in the fifth memory location of the data RAM memory 408. Accordingly, the switching computer 224 would store the address "5" in the second location of the connection memory 404 of the first node 210. Likewise, the computer 224 would store the address "2" in the fifth location of the connection memory 404 of the node 214 to complete call set up.

Once call setup is complete, the channel counter 400 sequentially causes pointer addresses to be selected and output to the frame memory 408, starting with a memory location for a first port, P1, and ending with a last port, P772. Each time the channel counter 400 of the second node 214 outputs a value of two, the pointer address of the fifth location of the frame memory 408 is provided as an output. Each time the channel counter 400 of the first node 210 outputs a value of five, the pointer address of the second location of the frame memory 408 is provided as an output. The result is that an input PCM word from port 2, node 1 is provided as an output through port 1, node 2 and an input PCM word from port 1, node 2 is provided as an output through port number 2, node 1.

Figure 9:
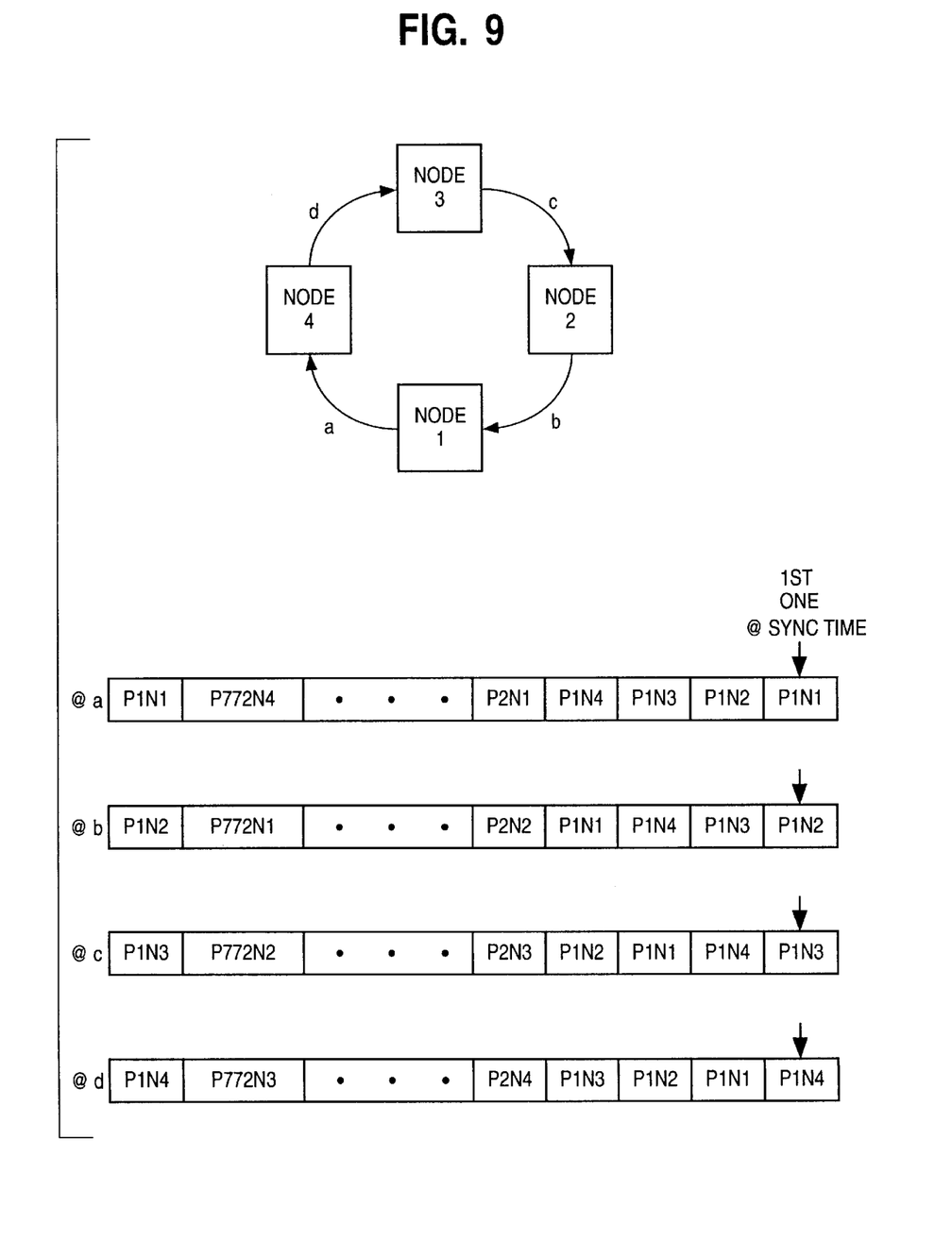
FIG. 9 depicts the data multi-frame as perceived from the switching nodes of FIG. 1.

Turning now to the ring 218 as a whole, it should be apparent that the multi-frame 500 would not appear to be identical at all nodes at any one instant of time. More specifically, the multi-frame 500 of data depicted in FIG. 5 is only descriptive of the data that may be observed at the first node. However, the first node takes its input from the second node, which takes its input from the third node, and so on up to node N, which takes its input from the first node. The multi-frame as perceived at the second node has a different order (FIG. 9); that is, the P1N2 output at the second node occurs substantially simultaneously with the P1N1 output at the first node. Because the P1N1 data does not propagate around the ring to the second node until N−1 clock cycles later, the P1N1 data is not received at the second node until after the P1N2 data is output from the second node. The multi-frame perceived at each node is thus unique.

Further, each node and its associated timeslot interchange 308 is uniquely identifiable by the control 224 by having each node's connection memory 404 uniquely memory mapped. Since the order of arrival of port data gets somewhat uniquely re-arranged as it moves around the ring 218, the multi-frame perceived by each node at any one instant of time is unique.

Each node's timeslot interchange 308 writes PCM data sequentially into memory in the order that it is received from the ring 218. The identification of data for transfer to a selected output may be accomplished either by a look-up table or by an algorithm developed for such purpose. Where an algorithm is used, the algorithm is a deterministic algorithm for N nodes and may be used by the switch control 224 to access the appropriate memory location when making connections to effectively unscramble this node-dependent data structure within the data memory.

In order to achieve a minimum sample rate (e.g., 8 kilo samples per second) for each port, the speed of the ring 218 must be adapted for the number of ports. For the system as shown in FIG. 2 with 3088 ports, a processing rate of 24.704 MHZ per byte would be expected. Where the size of the switch 100 is increased to 12 nodes then the processing rate of 74.112 MHZ per byte would be expected.

Since a processing speed of 74.112 MHZ per byte would be exceptionally high (i.e., 13.5 ns/byte) for reliable memory operation, a number of memory devices (e.g., latches 602, 604, 606, 608, 610 and RAMs 612, 614, 616, 618, 620, 622, 624, 626) and a multiplexer (FIG. 6) may be used in place of the data RAM memory 408. The use of eight RAMs of FIG. 6 changes the access time from 13.5 ns/byte to a more manageable 108 ns/byte.

Figure 6:
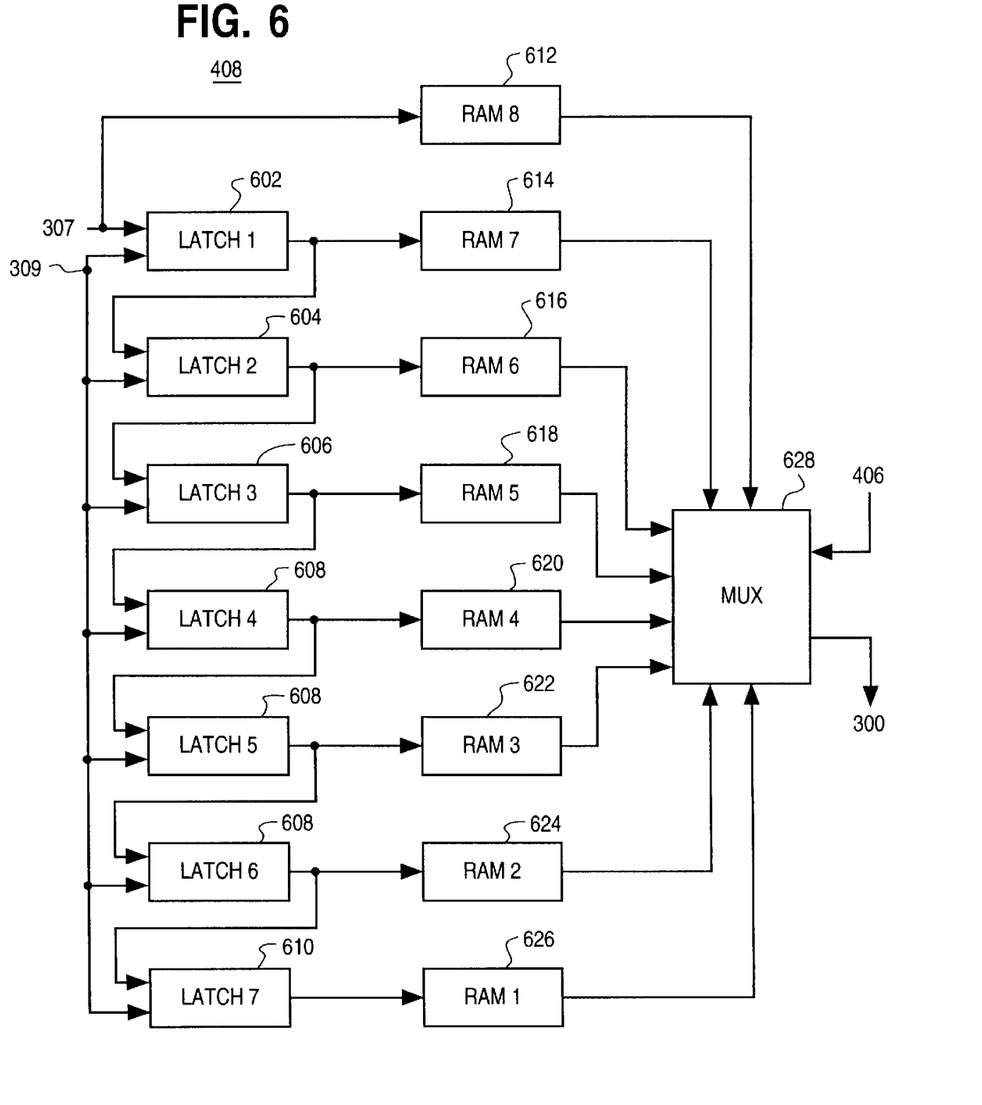
FIG. 6 depicts a data memory device of the timeslot interchange circuit under an alternate embodiment of the invention.

Under the embodiment, a set of latches 602, 604, 606, 608, 610 temporarily accumulate seven words of PCM data. As the eighth PCM word becomes available, all eight PCM words are shifted into the eight RAMs 612, 614, 616, 618, 620, 622, 624, 626. A MUX 628 may then transfer the words of PCM data to a selected output as a new set of eight PCM words is accumulated in the latches 602, 604, 606, 608, 610.

To accumulate the first seven words of PCM data, a clock input 309 is provided as an input to each of the seven latches 602, 604, 606, 608, 610. As a first PCM word is received by the first latch 602, the clock signal from the divider 310 latches the first PCM word into the first latch 602 upon the arrival of a first clock pulse 309. As the first PCM word is latched into the first latch 602, the output of the first latch 602 provides the first PCM word as an input to the second latch 604.

Following a time period, a second PCM word becomes available on the input 307. Upon the occurrence of the second clock pulse 309, the second PCM word becomes latched into the first latch 602. However, before the second clock pulse 309, the first PCM word was available as an input to the second latch 604. Upon the advent of the second clock pulse, the first PCM word is also transferred to the second latch 604.

Upon the third and subsequent clock pulses 309, other PCM words are shifted into the latches 602, 604, 606, 608, 610. Upon the arrival of the eighth PCM word, the frame location counter 410 generates a store command to store the eight PCM words in the eight RAMs 612, 614, 616, 618, 620, 622, 624, 626. The MUX 628 may then transfer the PCM words to the selected outputs.

In another embodiment of the invention and to avoid the possibility that the MUX 628 (FIG. 6) may attempt to access RAM8 612 before data is available, the structure of FIG. 6 may duplicated and used in alternate cycles. Under the embodiment, PCM data may be entered into a first set of eight RAMs 612, 614, 616, 618, 620, 622, 624, 626 while a second set of RAMs 612, 614, 616, 618, 620, 622, 624, 626 is accessed by a duplicate (or the same) MUX 628. Alternatively, the RAMs 612, 614, 616, 618, 620, 622, 624, 626 of FIG. 6 may be sized to hold two PCM words which may be accessed in alternate cycles by the MUX 628.

In another embodiment of the invention, the size of the multi-frame 500 and frequency of operation are fixed during the initial construction of the switch 100 to accommodate a maximum number of nodes. Fixing the number of frames in the multi-frame (and frequency of operation) during initial construction allows the size of the memory in the timeslot interchange 308 and the location of PCM words of within any timeslot interchange to be fixed, no matter how many nodes are later added to the system 100.

The advantage to be gained by using a fixed size multi-frame should be apparent where one considers a PCM word being transferred within a designated location of the multi-frame from the last node 214 to the first node 210 of FIG. 1. Where a port of the last node 214 inserts a PCM word into a designated location, that location would arrive at the first node X clock cycles later. However, if another node were added between the last node 214 and the first node 210 then the PCM word would arrive at the first node X+a clock cycles later. Further, where intervening PCM words are added to the multi-frame by the additional node, the PCM words from node 214 would be offset within the memory 408 of the timeslot interchange 308 of the first node 210.

To accommodate a constant size multi-frame, an equalizer 215 (FIG. 1) may be added to the ring 218. Under the embodiment, a variable number of latches 702, 704, 706, 708 (FIG. 7) may be included in series with the nodes 210, 212, 214, 216 of the ring 218. A MUX 210 samples an output of each of the latches 702, 704, 706, 708 and selects the output of the latch which provides the proper fixed size multi-frame.

Figure 7:
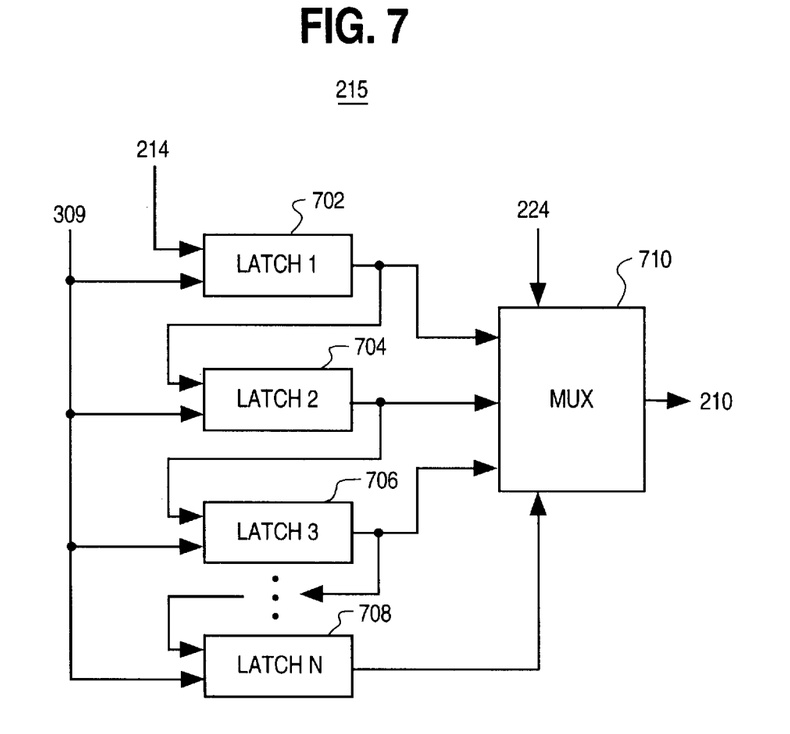
FIG. 7 is a block diagram of a ring equalizer under an alternate embodiment of FIG. 1.

The output selected of the latches 702, 704, 706, 708 may be determined by the switch controller 224. The switch controller 224 may determine which latch to select by polling the nodes 210, 212, 214, 216 during start-up to determine how many nodes are present.

Figure 8:
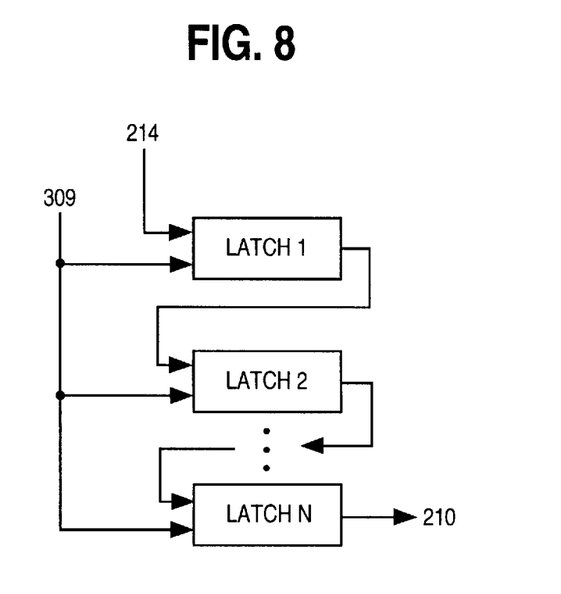
FIG. 8 is a block diagram of a ring equalizer under an alternate embodiment of FIG. 7.

Alternatively, the latches present in he equalizer 215 may be determined mechanically. For example, the switch 100 may be provided with a card cage (not shown) having a number of slots (e.g., 12) equal to the maximum number of nodes that could be used with the switch 100. Where the number of nodes is determined to be four, then circuit cards (not shown) providing the circuitry of the four nodes may be inserted into the card cage at any location. The remainder of the card cage is filled with cards (FIG. 8) having the same precise delay and frame holding capacity of an operating node 210, 212, 214, 216.

A specific embodiment of a method and apparatus of providing a telecommunications switch according to the present invention has been described for the purpose of illustrating the manner in which the invention is made and used. It should be understood that the implementation of other variations and modifications of the invention and its various aspects will be apparent to one skilled in the art, and that the invention is not limited by the specific embodiments described. Therefore, it is contemplated to cover the present invention any and all modifications, variations, or equivalents that fall within the true spirit and scope of the basic underlying principles disclosed and claimed herein.

What is claimed is:

1. A method of switching a sequence of data words of an information signal from a selected input to a selected output within a telecommunications switch having a plurality of switching nodes which together form a circulating data loop for a circulating data frame, such method comprising the steps of:
    synchronizing each of the plurality of nodes to a relative location of the node within the circulating data loop and data frame through use of a clock and a synchronization circuit connected directly to each node of the plurality of nodes of the telecommunications switch;
    writing the data words into a predetermined location of the data frame within the circulating data loop of the telecommunications switch through a first switching node;
    circulating the data frame around the circulating data loop from the first switching node to a second switching node;
    capturing the data words from within the predetermined location through the second switching node of the circulating data loop; and
    transferring the captured data words from the second switching node to the selected output of the telecommunications switch.

2. The method as in claim 1 further comprising circulating the data frame around the circulating data loop synchronously under the control of a clock signal.

3. The method as in claim 1 wherein the step of capturing the data words of the information signal further comprises the step of executing a deterministic algorithm to identify a relative location in the data frame of the data words at the second switching node after circulation of the predetermined location of the data words from the first switching node to the first switching node.

4. The method as in claim 3 further comprising converting the data words of the information signal into a serial format before circulating the representation from the first switching node to the second switching node.

5. The method as in claim 4 further comprising converting the information signal from the serial format to a parallel format at the second switching node.

6. The method as in claim 5 wherein the step of capturing the data words further comprising storing the information signal under the parallel format in a predetermined location of a first memory of the second switching node.

7. The method as in claim 6 further comprising storing an address of the predetermined location of the first memory in a second memory of the second switching node as a pointer for data to be transferred to the selected output.

8. A telecommunications switch for switching a sequence of data words of an information signal from a selected input to a selected output through a plurality of switching nodes which together form a circulating data loop for a circulating data frame of the telecommunications switch, such switch comprising:
    means coupled directly to each of the plurality of switching nodes of the telecommunications switch for synchronizing each of the plurality of nodes to a relative location of the node within the circulating data loop and data frame;
    means for writing the data words into a predetermined location of the data frame within the circulating data loop of the telecommunications switch through a first switching node of the circulating data loop;
    means for circulating the data frame around the circulating data loop from the first switching node to a second switching node;
    means for capturing the data words from within the predetermined location through the second switching node of the circulating data loop; and
    means for transferring the captured data words from the second node to the selected output of the telecommunications switch.

9. The switch as in claim 8 further comprising means for circulating the data frame around the circulating data loop under the control of a clock signal.

10. The switch as in claim 9 further comprising means for tracking the predetermined location by a loop controller as it is circulated around the circulating data loop.

11. The switch as in claim 10 further comprising means for converting the pulse coded modulated representation into a serial format before circulating the representation from the first switching node to the second switching node.

12. The switch as in claim 11 further comprising means for converting the representation from the serial format to a parallel format at the second switching node.

13. The switch as in claim 12 wherein the means for capturing the representation further comprises means for storing the representation under the parallel format in a predetermined location of a first memory of the second switching node.

14. The switch as in claim 13 further comprising means for storing an address of the predetermined location of the first memory in a second memory of the second switching node as a pointer for data to be transferred to the selected output.

15. A telecommunications switch for switching a sequence of data words of an information signal from a selected input to a selected output through a plurality of switching nodes which together form a circulating data loop for a circulating data frame of the telecommunications switch, such switch comprising:

a synchronization circuit directly coupled to each of the plurality of switching nodes of the telecommunication switch and adapted to synchronize each of the plurality of nodes to a relative location of the node within the circulating data loop and data frame;

the circulating data loop of the telecommunications switch which accepts the data words of the information signal within a first switching node of the circulating data loop and circulates the information signal around the loop;

a clock coupled to each switching node and adapted to circulate the data frame around the circulating data loop from the first switching node to a second switching node;

a first processor coupled to the circulating data loop and configured to capture the data words of the information signal from within the predetermined location through the second switching node of the circulating data loop and to transfer the data words of the information signal from the second switching node to the selected output.

16. The telecommunications switch as in claim 15 further comprising a clock which circulates the information signal around the circulating data loop.

17. The telecommunications switch as in claim 15 further comprising a multiplexer which multiplexes the information signal into a circulating data frame.

18. The telecommunications switch as in claim 17 wherein the circulating data frame further comprises a circulating multi-frame of a plurality of information signals being switched from a plurality of selected inputs to a plurality of selected outputs, respectively.

19. The telecommunications switch as in claim 17 wherein the circulating multiframe further comprises an expandable multiframe.

20. The telecommunications switch as in claim 19 further comprising a parallel to serial converter which accepts the pulse code modulated information signal from the analog to digital converter and which provides a serial information signal.

21. The telecommunications switch as in claim 17 further comprising a second processor operably connected to the first processor which tracks the information signal of the circulating data frame around the circulating data loop.

22. The telecommunications switch as in claim 15 wherein the circulating data loop further comprises a serial data link.

23. The telecommunications switch as in claim 15 wherein the first processor which captures the information signal at the second station further comprises a latch.

24. The telecommunications switch as in claim 23 wherein the first processor for capturing the information signal and transferring the information signal to the selected output further comprise a second memory containing an address pointing to the predetermined location in the first memory.

25. The telecommunications switch as in claim 23 wherein the circulating data loop further comprises a multiframe of a predetermined number of frames.

26. The telecommunications switch as in claim 23 further comprising an equalizer which holds a portion of the multiframe.

27. The telecommunications switch as in claim 26 further comprising a switch controller which executes a deterministic tracking algorithm of each frame of the multiframe.

28. The telecommunications switch as in claim 15 further comprising a first memory which stores the information signal in a predetermined location.

* * * * *